United States Patent

[11] 3,576,490

| | | | | |
|---|---|---|---|---|
| [72] | Inventor | Tsutomu Nishino Yokohama, Japan | [56] | References Cited |
| [21] | Appl. No. | 790,746 | | UNITED STATES PATENTS |
| [22] | Filed | Jan. 13, 1969 | 3,434,049 3/1969 Frye.......................... 324/52 |
| [45] | Patented | Apr. 27, 1971 | | FOREIGN PATENTS |
| [73] | Assignee | Matsushita Electric Industrial Co., Ltd. Osaka, Japan | 152,026 1/1962 U.S.S.R....................... 324/60 |
| [32] | Priority | Jan. 18, 1968, Jan. 19, 1968 | Primary Examiner—Edward E. Kubasiewicz |
| [33] | | Japan | Attorney—Stevens, Davis, Miller and Mosher |
| [31] | | 43/3105 and 43/3642 | | |

[54] METHOD AND APPARATUS OF DETECTING THE IMPEDANCE OF COAXIAL TRANSMISSION LINE BY CHARGING AND DISCHARGING SAID LINE
7 Claims, 6 Drawing Figs.

[52] U.S. Cl..................................................... 324/57, 324/52
[51] Int. Cl...................................................... G01r 27/00
[50] Field of Search............................................ 324/60 (CD), 52, 57 (CO), 570

ABSTRACT: A method and apparatus for measuring the impedance of a coaxial transmission line in which a coaxial line to be measured is connected in an intermediate portion of a cable having a known characteristic impedance, and after the cable is charged up to a certain voltage, the charge is discharged by a large-capacity high-speed switch through a resistive terminator having a resistor whose impedance matches the known impedance. The discharged pulse voltage waveform appearing across the terminals of the resistor is observed by an oscilloscope to measure the impedance of the coaxial transmission line.

Patented April 27, 1971
3,576,490
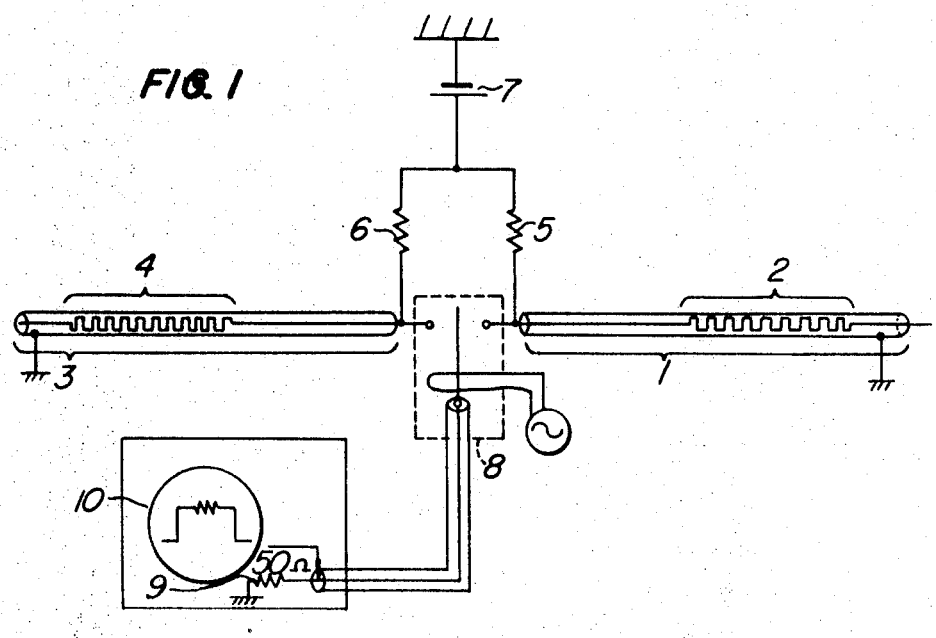
FIG. 1
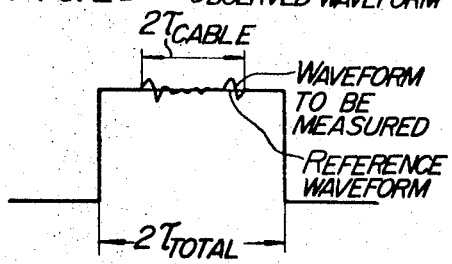
FIG. 2a  OBSERVED WAVEFORM
FIG. 2c INDUCTIVE IMPEDANCE WAVEFORM
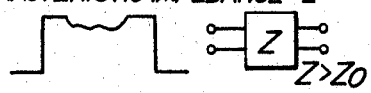
FIG. 2d CHARACTERISTIC IMPEDANCE: Z
Z>Zo
FIG. 2b CAPACITIVE IMPEDANCE WAVEFORM
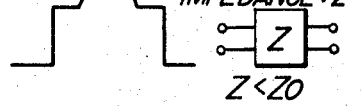
FIG. 2e CHARACTERISTIC IMPEDANCE: Z
Z<Zo
INVENTOR
TSUTOMU NISHINO
BY Stevens, Davis, Miller & Mosher
ATTORNEYS

METHOD AND APPARATUS OF DETECTING THE IMPEDANCE OF COAXIAL TRANSMISSION LINE BY CHARGING AND DISCHARGING SAID LINE

This invention relates to a method and apparatus for measuring the impedance of a coaxial transmission line along the direction of the line.

Recently, a method called Time Domain Reflectometry is widely in use which comprises applying a unit step pulse having a fast rise time to a coaxial transmission line whose impedance is to be measured and observing its reflected voltage waveform on an oscilloscope for direct viewing and measurement of the manner of variation of the line impedance which varies from place to place along the transmission line. A measuring apparatus based on the above principle is also on the market. However, this method requires a unit step pulse generator having a fast rise time for the effective measurement of the impedance since the method utilizes the unit step pulse.

It is therefore an object of the present invention to provide a novel and improved method and apparatus which does not employ the unit step pulse generator and is adapted to observe the manner of variation of the amplitude of a square waveform having a fast rise time generated by a circuit employing a mercury wetted reed switch which has a fast switching rise time in the order of 0.2 nanoseconds and a large current capacity thereby measuring a variation of the impedance along a coaxial transmission line whose impedance is to be measured.

In accordance with the apparatus of the present invention employing a circuit developing a single pulse, the impedance for calibration or impedance of another coaxial transmission line (to be used as a reference impedance) and the impedance of a transmission line to be measured can simultaneously be displayed on the same oscilloscope by means of the time sharing system so that these impedances can easily be compared with each other. Furthermore, according to the present invention which employs a mercury pulser instead of a high-performance, fast rise time, unit step pulse generator using a tunnel diode or the like, the impedance and delay time characteristics of a coaxial transmission line can very easily be measured with a precision equivalent to that obtained with the known Time Domain Reflectometry.

The known Time Domain Reflectometry has been defective in that a direct viewing synchroscope using a traveling-wave cathode-ray tube having a low deflection sensitivity can not be employed therein because the output level of a unit step pulse generated from the generator is so low or in the order of several hundred millivolts. The present invention eliminates such a difficulty due to the fact that a high pulse voltage can be generated through a high-speed large-capacity switch and thus a traveling-wave cathode-ray tube can effectively be used for the measurement of the impedance of a coaxial transmission line.

Other objects, features and advantages of the present invention will be apparent from the following description of a preferred embodiment thereof when read in conjunction with the accompanying drawings, in which:

FIG. 1 is an electrical connection diagram of the impedance measuring apparatus embodying the present invention; and FIGS. 2a to 2e are diagrammatic illustrations of various waveforms observed by the apparatus shown in FIG. 1.

Referring to FIG. 1 showing a preferred embodiment of the present invention, a coaxial transmission line 2 whose impedance is to be measured is connected between two separate sections of a charging coaxial line 1, whose outer conductor is grounded and whose inner conductor is open-circuited at its one end. At one end of each separate section are provided means connecting the coaxial line 2 coaxially and continuously between the two sections. A calibrating coaxial line 4 is connected between two separate sections of a second charging coaxial line 3, in the same manner as described in the connection between the coaxial lines 1 and 2. In some cases, the second charging coaxial line 3 may be short circuited so that it may be out of use.

The coaxial lines 1 and 3 have one of their terminals connected through respective high resistances 5 and 6 to the anode of a charging DC supply 7 whose cathode is grounded. A switching means 8 including a known mercury wetted reed switch and an actuator operating said mercury switch at a repetition frequency in the range of 400 to 700 Hz. is provided to selectively connect one of the terminals of the coaxial lines 1 and 3 to a 50-ohm load resistor 9 forming a resistive terminator. The impedance of the resistor 9 matches with the characteristic impedance of the line 1. The fact that the mercury wetted reed switch can operate with its contact time in the order of a few microseconds is essential to establish an instantaneous discharge path between either of lines 1 and 3 and the resistor 9. Reference numeral 10 designates an ultra broadband oscilloscope or sampling oscilloscope for observing the voltage waveform appearing across the resistor 9.

The coaxial line including the lines 1 and 2 is supplied from the DC supply 7 with a charge which corresponds to a variation in the impedance along the line.

In operation, one terminal of the line 1 is connected with the terminating resistor 9 of 50 ohms by the mercury switch of said switching means 8 and the charge stored in the coaxial line is discharged so as to observe the voltage waveform appearing across the resistor 9 by the oscilloscope 10. This voltage waveform represents the pattern of the charge stored in proportion to a variation in the impedance along the coaxial line, or more specifically, the voltage waveform represents the manner of variation of the impedance along the coaxial line. When, therefore, there is no variation in the impedance of the coaxial line 2 being measured, no variation occurs in the amplitude of the waveform appearing during $2\tau_{cable}$ which is twice the transmission time $\tau_{cable}$ through the length of the line 2 being measured. Consequently, the square waveform whose pulse width is represented by $2\tau_{total}$ which is twice the transmission time $\tau_{total}$ through the total length of the charging coaxial line 1 has an ideal shape free from any concavity and convexity. When the impedance of the line 2 is capacitive or inductive, the resultant waveforms have respective shapes as shown in FIGS. 2b and 2c.

When shapes of these waveforms are thus contrary to those obtained with the known Time Domain Reflectometry. When the characteristic impedance Z of the line 2 is higher or lower than the characteristic impedance Zo of the reference impedance, the resultant waveforms have respective shapes as shown in FIGS. 2d and 2e. Then when the calibrating line 4 is connected to the charging coaxial line 3 in FIG. 1, the waveform of a standard or reference impedance can simultaneously be displayed on the same display screen of the oscilloscope 10 as shown in FIG. 2a so that these two waveforms can very simply be compared with each other.

I claim:

1. A method of detecting the impedance of a coaxial transmission line under test comprising:
   coupling the test line coaxially between two separate sections of a known coaxial transmission line having uniform electrical characteristics and being open-circuited at one one;
   continuously energizing said known and test transmission lines through a resistor having a high resistance value to charge said lines;
   periodically establishing a discharge path between a load resistor forming a resistive terminator having an impedance which matches the characteristic impedance of a further known line and the charged lines; and
   displaying on an ultrawide band oscilloscope a voltage waveform appearing across said load resistor, thereby detecting a distribution pattern of the charges stored on said lines as a representation of the impedance variation thereof.

2. A method of detecting the impedance of a coaxial transmission line under test comprising:
   coupling the test line coaxially between two separate sections of a first known coaxial transmission line having uniform electrical characteristics and being open-circuited at one end;

providing a second known coaxial transmission line having substantially the same electrical characteristics and dimensions as those of said first known transmission line and having a reference coaxial transmission line in a position corresponding to that of said test coaxial line;

continuously energizing said first and second transmission lines individually through respective high resistance resistors;

periodically establishing respective discharge paths alternately between a load resistor, forming a resistive terminator having an impedance which matches the characteristic impedance of said known lines and said first line coupled with said test line and between said load resistor and said second line coupled with said reference line; and displaying on an ultrawide band oscilloscope a voltage waveform across said load resistor, thereby detecting the distribution pattern of the charges stored on said first line coupled with said test line comparatively with that of the second line coupled with said reference line.

3. The method according to claim 2, which includes switching means having a high switching speed and a large current capacity and operable at a relatively high frequency for changing over alternately the first and second lines to the load resistor.

4. An apparatus for detecting the impedance of a test coaxial transmission line comprising:

a DC power source;

a first coaxial line having known uniform electrical and physical properties and coaxially separated into at least two sections, of which an inner conductor is open-circuited at its one end and of which an outer conductor is grounded;

a resistor of a high resistance connected between said power source and the other end of said known line;

means provided at ends of the two sections of said known coaxial line for coupling the test coaxial line coaxially between said two sections;

load means forming a resistive terminator having an impedance which matches the characteristic impedance of said known line;

switching means disposed between the other end of said known line and said load means and having a high switching speed and a large current capacity, said switching means effecting a rapid electrical connection between said other end of the known line and said load means so as to be responsible to rapid discharge of charged lines; and means displaying a voltage waveform appearing across said load means.

5. The apparatus according to claim 4, further comprising:

a second known coaxial transmission line having the same electrical and physical properties as those of said first known line and having a reference coaxial transmission line in a position of the second line corresponding to that of said test coaxial line and having one end open-circuited;

another resistor of a high resistance connected between said second coaxial line and said power source; and said switching means being a changeover switch connecting said first and second lines alternately to the load means.

6. The apparatus according to claim 4, in which said switching means includes a mercury switch and means actuating the switch at a relatively high frequency.

7. The apparatus according to claim 5, in which said switching means includes a mercury switch having two fixed contacts, one of which is connected to the other end of said first known line and the other to the other of said second known line and one movable contact connected to said load means, and means actuating the movable contact of said switch to contact said two fixed contacts alternately at a relatively high frequency.